(12) United States Patent
Atsumi et al.

(10) Patent No.: US 9,661,173 B2
(45) Date of Patent: May 23, 2017

(54) IMAGE FORMING APPARATUS, IMAGE PROCESSING METHOD, AND RECORDING MEDIUM

(75) Inventors: Tomoyuki Atsumi, Toyohashi (JP);
Kaoru Fukuoka, Toyokawa (JP); Shin Ohba, Kokubunji (JP); Eiichi Narimatsu, Toyokawa (JP); Tomohide Tatara, Yaizu (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/454,941

(22) Filed: Apr. 24, 2012

(65) Prior Publication Data

US 2012/0274983 A1    Nov. 1, 2012

(30) Foreign Application Priority Data

Apr. 27, 2011 (JP) .................................. 2011-100241

(51) Int. Cl.
*G06F 3/12* (2006.01)
*H04N 1/00* (2006.01)
*H04N 1/23* (2006.01)
*H04N 1/32* (2006.01)

(52) U.S. Cl.
CPC ....... *H04N 1/00954* (2013.01); *G06F 3/1213* (2013.01); *G06F 3/1217* (2013.01);
(Continued)

(58) Field of Classification Search
CPC .................................................. G06K 15/02
(Continued)

(56) References Cited

U.S. PATENT DOCUMENTS 2,003,125 A    5/1935   Stevens
5,726,769 A    3/1998   Imai et al.
(Continued)

FOREIGN PATENT DOCUMENTS

CN    101009748 A    8/2007
JP    07-177280 A    7/1995
(Continued)

OTHER PUBLICATIONS

Second Office Action issued on Nov. 15, 2014, by the Chinese Patent Office in corresponding Chinese Patent Application No. 2012 10126 438.5, and an English Translation of the Office Action. (21 pages).

*Primary Examiner* — Marivelisse Santiago Cordero
*Assistant Examiner* — Kevin Ky
(74) *Attorney, Agent, or Firm* — Buchanan Ingersoll & Rooney PC (57) ABSTRACT

An image forming apparatus comprises: a receiver which receives facsimile or print data file in a page description language, from an information processing apparatus; a spooler which stores the facsimile or print data file received therefrom, on the spooler itself; a converter which converts the facsimile or print data file stored on the spooler, to an image data format; a job generator which generates a job based on the obtained image data file; a facsimile transmitter; a printer; and a job controller which instructs the facsimile transmitter or the printer to perform facsimile transmission or printing according to the generated job, respectively. And the converter selects the facsimile or print data file among those stored on the spooler, based on the state of the printer and the state of the facsimile transmitter, before converting the facsimile or print data file to an image data format.

21 Claims, 9 Drawing Sheets

(52) U.S. Cl.
CPC .......... *G06F 3/1263* (2013.01); *G06F 3/1285* (2013.01); *H04N 1/00204* (2013.01); *H04N 1/00278* (2013.01); *H04N 1/233* (2013.01); *H04N 1/2369* (2013.01); *H04N 1/32363* (2013.01); *G06F 3/1247* (2013.01); *H04N 2201/0039* (2013.01); *H04N 2201/0067* (2013.01); *H04N 2201/0094* (2013.01); *H04N 2201/3288* (2013.01)

(58) Field of Classification Search
USPC ................................................ 358/1.13–1.16
See application file for complete search history.

(56) References Cited

U.S. PATENT DOCUMENTS

| | | | | |
|---|---|---|---|---|
| 5,933,586 | A * | 8/1999 | Lee | 358/1.16 |
| 6,058,249 | A * | 5/2000 | Matsuda et al. | 358/1.14 |
| 6,075,928 | A * | 6/2000 | Kitada et al. | 358/1.15 |
| 6,115,141 | A * | 9/2000 | Kim | 358/404 |
| 7,952,758 | B2 * | 5/2011 | Suzuki | 358/1.9 |
| 8,149,448 | B2 * | 4/2012 | Oswald | 358/1.16 |
| 2007/0177180 | A1 | 8/2007 | Yamada et al. | |
| 2009/0237725 | A1 * | 9/2009 | Hamaguchi | 358/1.15 |
| 2010/0027067 | A1 * | 2/2010 | Tsunekawa | 358/1.15 |
| 2011/0075184 | A1 * | 3/2011 | Kurakata | 358/1.13 |

FOREIGN PATENT DOCUMENTS

| | | |
|---|---|---|
| JP | 11-154947 A | 6/1999 |
| JP | 2000-358124 A | 12/2000 |
| JP | 2003-018378 A | 1/2003 |

* cited by examiner

Spooled Data Management Table

| No | Mode | File name |
|---|---|---|
| 1 | FAX | file 001 |
| 2 | Print | file 002 |
| 3 | FAX | file 003 |
| ⋮ | ⋮ | ⋮ |

Job State Management Table

| Type of Job | State | Number of Waiting Jobs |
|---|---|---|
| FAX Transmission | busy | 5 |
| Print | Idle | 0 |
| Others | Idle | 0 |

IMAGE FORMING APPARATUS, IMAGE PROCESSING METHOD, AND RECORDING MEDIUM

This application claims priority under 35 U.S.C. §119 to Japanese Patent Application No. 2011-100241 filed on Apr. 27, 2011, the entire disclosure of which is incorporated herein by reference in its entirety.

BACKGROUND OF THE INVENTION

Field of the Invention

The present invention relates to: an image forming apparatus such as a multifunctional digital machine, an image processing method for the image forming apparatus, and a recording medium with an image processing program being stored thereon.

Description of the Related Art

The following description sets forth the inventor's knowledge of related art and problems therein and should not be construed as an admission of knowledge in the prior art.

The image forming apparatuses called as MFPs (Multi Function Peripherals) which means multifunctional digital machines collectively having a plurality of functions such as copier function, printer function, and facsimile function, are capable of: receiving print data from an information processing apparatus such as a personal computer and printing it out according to specified conditions; and receiving facsimile data from the same and transmitting a facsimile to a specified address.

Usually, print or facsimile data to be received from an information processing apparatus is written in a page description language (PDL). When receiving print or facsimile data therefrom, such an image forming apparatus drops it to a spooler then converts to a bitmap image (this conversion operation is commonly referred to as "ripping"). And this image forming apparatus generates print or facsimile jobs based on the obtained image data then execute the jobs.

Whether it is print data or facsimile data, the image forming apparatus executes the same processing routine including: receiving data from an information processing apparatus; performing spooling; performing ripping; and generating jobs. And during the processing routine, there has been a problem due to a long ripping time as described below.

That is, the processor may be occupied for a long time with the task of ripping a large amount of facsimile data which is received from an information processing apparatus. This also means that the printer may be prohibited from printing out print data which is further received from an information processing apparatus, until the end of the ripping operation, even though the printer is in idle mode. This has been a problem with this image forming apparatus.

This problem is often caused by facsimile data which is received along with instructions for facsimile broadcast, because a cover letter may need to be addressed to multiple addresses according to the instructions.

Usually, facsimile jobs require a long processing time unlike print jobs; and the memory therefore may be too small for the processor to keep up with the task of generating new jobs because of a large amount of facsimile data from an information processing apparatus and so many facsimile jobs waiting in the queue. Also being occupied for a long time with the task of ripping the facsimile data, the processor may not be able to start other tasks so soon, resulting in that people are kept waiting for a long time to obtain their printouts from the printer.

As disclosed in Japanese Unexamined Patent Publication No. 2003-018378, there is a technology to reduce an amount of broadcast data including cover letters; and according to this technology, an information processing apparatus transmits only one message and as many cover letters as the number of multiple addresses to an image forming apparatus, and the image forming apparatus transmits this message along with a different cover letter depending on the address as a broadcast facsimile.

According to a technology disclosed in Japanese Unexamined Patent Publication No. H11-0154947, a broadcast job is divided into some groups so that the image forming apparatus can transmit a non-broadcast facsimile very soon by allowing it to slip in between such groups.

And according to a technology disclosed in Japanese Unexamined Patent Publication No. H07-177280, users upload cover letter files for the broadcast recipients to a server from client computers so that the server can transmit a broadcast facsimile with different cover letters depending on the recipient; and users upload their documents to a shared area of a facsimile server so that the facsimile server can transmit the uploaded documents as a broadcast facsimile at a predetermined time.

As is obvious from the publications above, these technologies, all which relate to an image forming apparatus performing processing on facsimile data from an information processing apparatus, do not provide a solution to the problem that a long ripping time due to a large amount of facsimile data received may lead to a long queuing time for print data further received after the facsimile data as described above.

Similar to this, there has been another problem that a large amount of print data received may lead to a long queuing time for facsimile data further received after the print data, which is still unsolved too.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to an image forming apparatus comprising:
 a receiver which receives facsimile or print data file written in a page description language, from an information processing apparatus;
 a spooler which stores the facsimile or print data file received by the receiver, on the spooler itself;
 a converter which converts the facsimile or print data file stored on the spooler, from a page description language to an image data format;
 a job generator which generates a job based on the image data file obtained by the converter;
 a facsimile transmitter which performs facsimile transmission;
 a printer which performs printing; and
 a job controller which instructs the facsimile transmitter or the printer to perform facsimile transmission or printing according to the job generated by the job generator, respectively, wherein the converter selects the facsimile or print data file among those stored on the spooler, based on the state of the printer and the state of the facsimile transmitter, before converting the facsimile or print data file to an image data format.

A second aspect of the present invention relates to an image processing method for an image forming apparatus, comprising:
  receiving facsimile or print data file written in a page description language, from an information processing apparatus;
  storing the facsimile or print data file received from the information processing apparatus, on a spooler;
  converting the facsimile or print data file stored on the spooler, from a page description language to an image data format;
  generating a job based on the image data file obtained by the ripping operation; and
  instructing a facsimile transmitter or a printer to perform facsimile transmission or printing according to the job generated based on the obtained image data file, respectively,
wherein the facsimile or print data file is selected among those stored on the spooler, based on the state of the printer and the state of the facsimile transmitter, before converting the facsimile or print data file to an image data format.

A third aspect of the present invention relates to an image processing program making a computer of an image forming apparatus execute:
  receiving facsimile or print data file written in a page description language, from an information processing apparatus;
  storing the facsimile or print data file received from the information processing apparatus, on a spooler;
  converting the facsimile or print data file stored on the spooler, from a page description language to an image data format;
  generating a job based on the image data file obtained by the ripping operation; and
  instructing a facsimile transmitter or a printer to perform facsimile transmission or printing according to the job generated based on the obtained image data file, respectively,
wherein before being converted to an image data format, the facsimile or print data file is selected among those stored on the spooler, based on the state of the printer and the state of the facsimile transmitter.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/ or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, one mode of implementing the present invention will be described.

Figure 1:
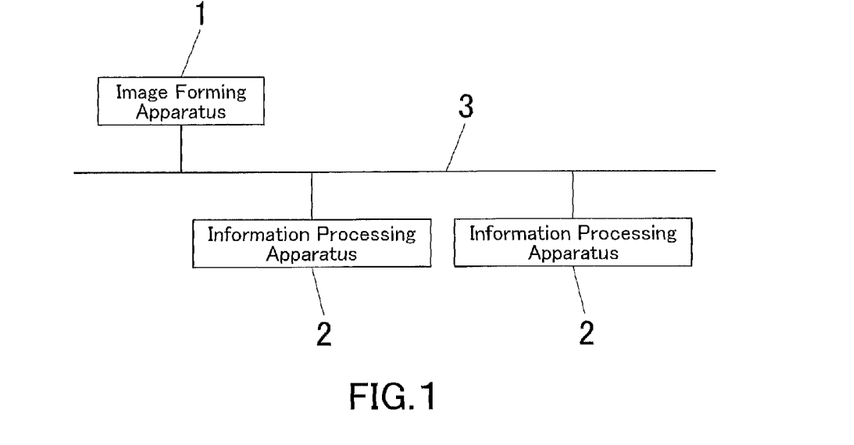
FIG. 1 is a view illustrating a configuration of an image processing system in which an image forming apparatus according to one mode of implementing the present invention is employed.

FIG. 1 is a view illustrating a configuration of an image processing system in which an image forming apparatus according to one mode of implementing the present invention is employed.

The image processing system is composed of an image forming apparatus 1 and a plurality of information processing apparatuses 2 all of which are connected to each other via a network 3.

The information processing apparatus 2 is composed of a personal computer; the information processing apparatus 2 is allowed to make the image forming apparatus 1 perform printing or transmit a facsimile to a specified address, by transmitting to the image forming apparatus 1 print or facsimile data written in a page description language.

It should be noted that "facsimile" also will be referred to as "FAX" hereinafter, and facsimile data to be sent to the image forming apparatus 1 from the information processing apparatus 2 also will be referred to as "PC-FAX data" or simply "FAX data".

Figure 2:
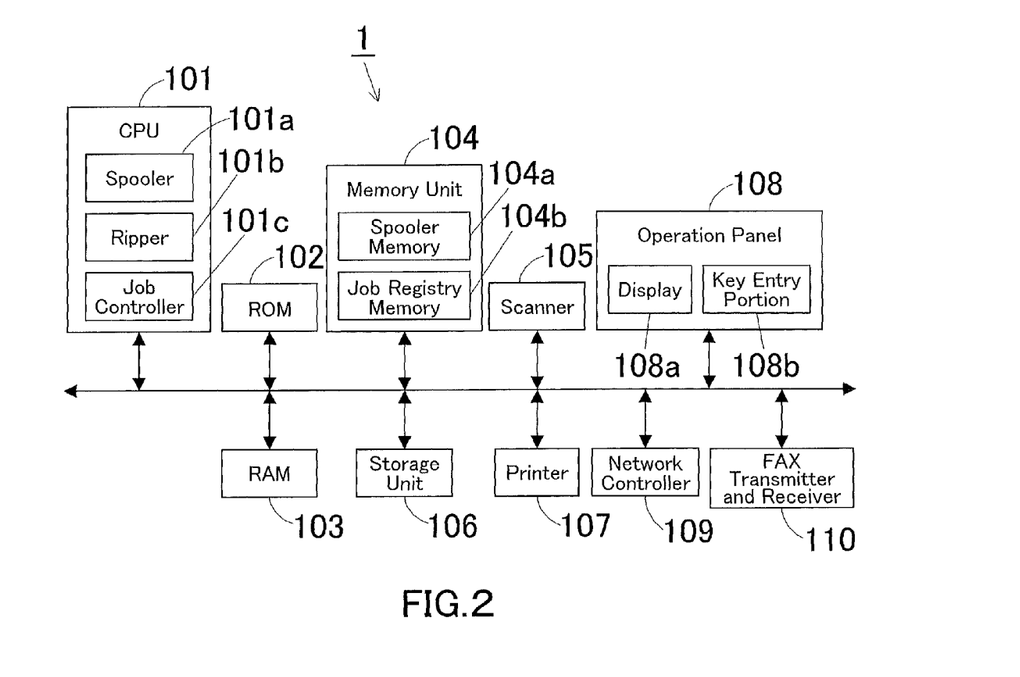
FIG. 2 is a block diagram illustrating a configuration of the image forming apparatus.

FIG. 2 is a block diagram schematically illustrating a configuration of an image forming apparatus according to one mode of implementing the present invention.

The image forming apparatus 1 is composed of a MFP which is a multifunctional digital machine collectively having a plurality of functions such as copier function, printer function, scanner function, and facsimile function. The image forming apparatus 1 is provided with a CPU 101, a ROM 102, a RAM 103, a memory unit 104, a scanner 105, a storage unit 106, a printer 107, an operation panel 108, a network controller (NIC) 109, a FAX transmitter and receiver 110, and the like.

The CPU 101 allows performing basic functions such as copier function, printer function, scanner function, facsimile function, and the like, by integrally controlling the image forming apparatus 1. In this mode of implementation, the CPU 101 is provided with a spooler 101a, a ripper 101b, and a job controller 101c as functions.

The spooler 101a stores PC-FAX and print data in a page description language, which is received by the network controller 109 from the information processing apparatus 2, temporarily in a memory of the memory unit 104. The ripper 101b converts PC-FAX and print data in a page description language, which is temporarily stored on the memory (spooled in the background) by the spooler 101a, to an image data format (this conversion operation is also referred to as "ripping"). After the ripping operation, the job controller 101c generates jobs, drops them in the queue, and instructs the FAX transmitter and receiver 110 to transmit a facsimile or the printer 107 to perform printing. All these operations of the CPU 101 will be later described in details.

The ROM 102 is a memory which stores operation programs for the CPU 101, and the like.

The RAM 103 provides a work area for the CPU 101 to execute processing according to operation programs.

The memory unit 104 is provided with various memory sections such as a spooler memory 104a and a job register memory 104b.

The spooler memory 104a temporarily stores PC-FAX and print data received by the network controller 109.

The job register memory 104b holds in the queue, jobs generated based on the image data obtained by the ripping operation. The capacity of the job register memory 104 determines the upper limit on the number of jobs to be registered: PC-FAX jobs (also referred to as FAX jobs, simply) waiting for their turns to transmit PC-FAX data as a facsimile and print jobs waiting for their turns to print out print data.

Each memory section of the memory unit 104 may be composed of one memory unit, not composed of one section of a memory unit. The storage unit 106 may serve as an alternative to some or all memory sections of the memory unit 104.

The scanner 105 reads images from a document placed on the document glass (not illustrated in this Figure) so as to output image data.

The storage unit 106 is composed of a non-volatile recording medium such as a hard disk drive (HDD). The storage unit 106 stores image data read out by the scanner 105, and the like.

The printer 107 prints out image data read out from a document by the scanner 105, print data which was subjected to ripping after received from the information processing apparatus 2, and the like according to a specified mode.

The operation panel 108 is used for various entry operations. The operation panel 108 is provided with: a display 108a which is composed of a liquid crystal display panel with touch-panel functionality displaying messages, operation screens, and the like; and a key entry portion 108b which is provided with numeric keys, a Start key, a Stop key, and the like.

The network controller 109 serves to transmit and receive data by controlling the communication with the information processing apparatuses 2, other image forming apparatuses, and other external devices all of which are connected to each other via the network 3.

The FAX transmitter and receiver 110 transmits and receives a facsimile to and from external FAX machines.

Figure 3:
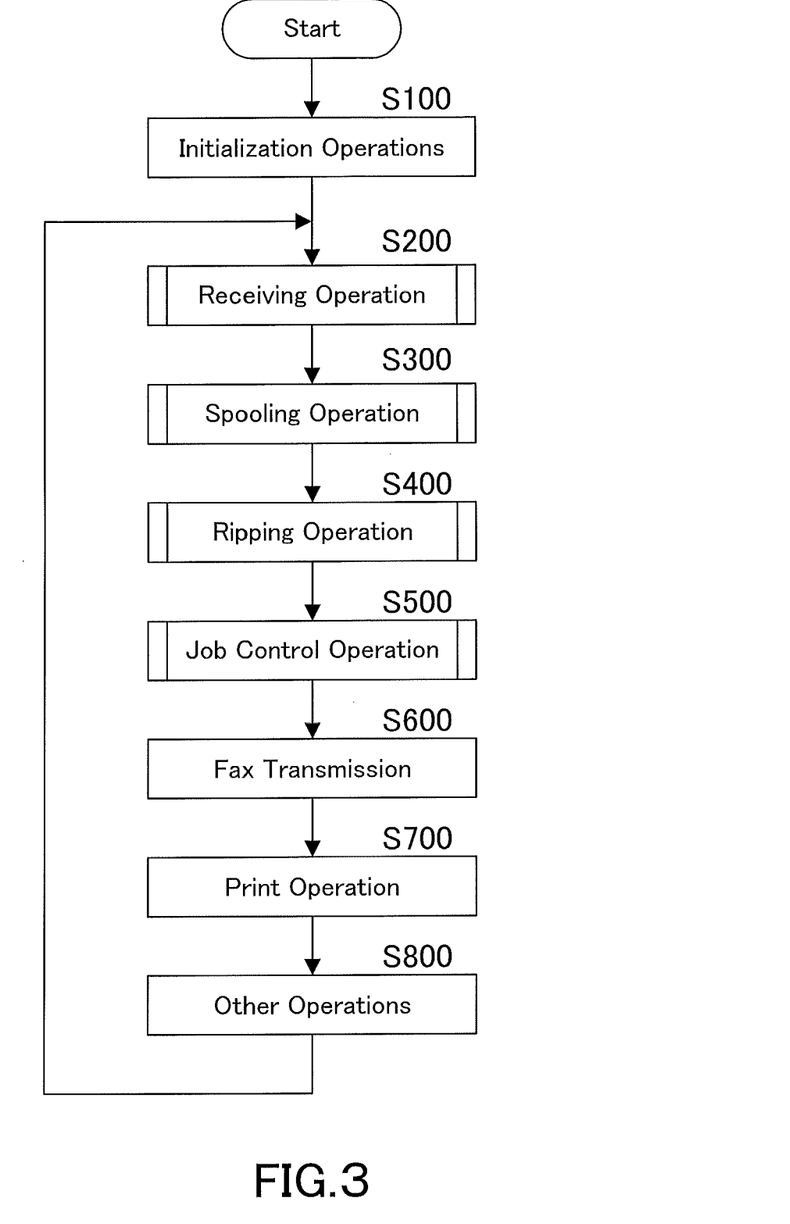
FIG. 3 is a flowchart representing a processing routine of the image forming apparatus.

FIG. 3 is a flowchart to explain the operation of the image forming apparatus 1. The processing routine is executed by the CPU 101 according to an operation program stored on a recording medium such as the ROM 102.

As shown in FIG. 3, various initialization operations are performed by the CPU 101 in Step S100. And a receiving operation is performed in Step S200: data is received from an external device such as the information processing apparatus 2 and a suitable operation is performed accordingly.

And then, a spooling operation is performed by the spooler 101a in Step S300: the PC-FAX or print data received in the receiving operation is stored on the spooler memory 104a of the memory unit 104. Subsequently, in Step S300, in response to a request from the ripper 101b, data stored on the spooler memory 104a is transferred to the ripper 101b so that it will be subjected to ripping thereby.

In Step S400, a ripping operation is performed by the ripper 101b. Specifically, the PC-FAX or print data in a page description language, which is received from the spooler 101a, is converted to an image data format.

And in Step S500, the obtained image data is transferred to the job controller 101c so that it will be subjected to a job control operation thereby. Specifically, a PC-FAX or print job is generated based on the image data obtained by the ripping operation, then registered on the memory. Thus the state of the job will be monitored.

In Step S600, instructions for the PC-FAX job are transmitted to the FAX transmitter and receiver 110, and the FAX transmitter and receiver 110 performs FAX transmission accordingly. And in Step S700, the printer 107 is instructed to execute the print job, and the printer 107 performs printing accordingly.

After other operations are performed in Step S800, the CPU 101 returns to the receiving operation of Step S200 so as to repeat Steps S200 to S800.

Figure 4:
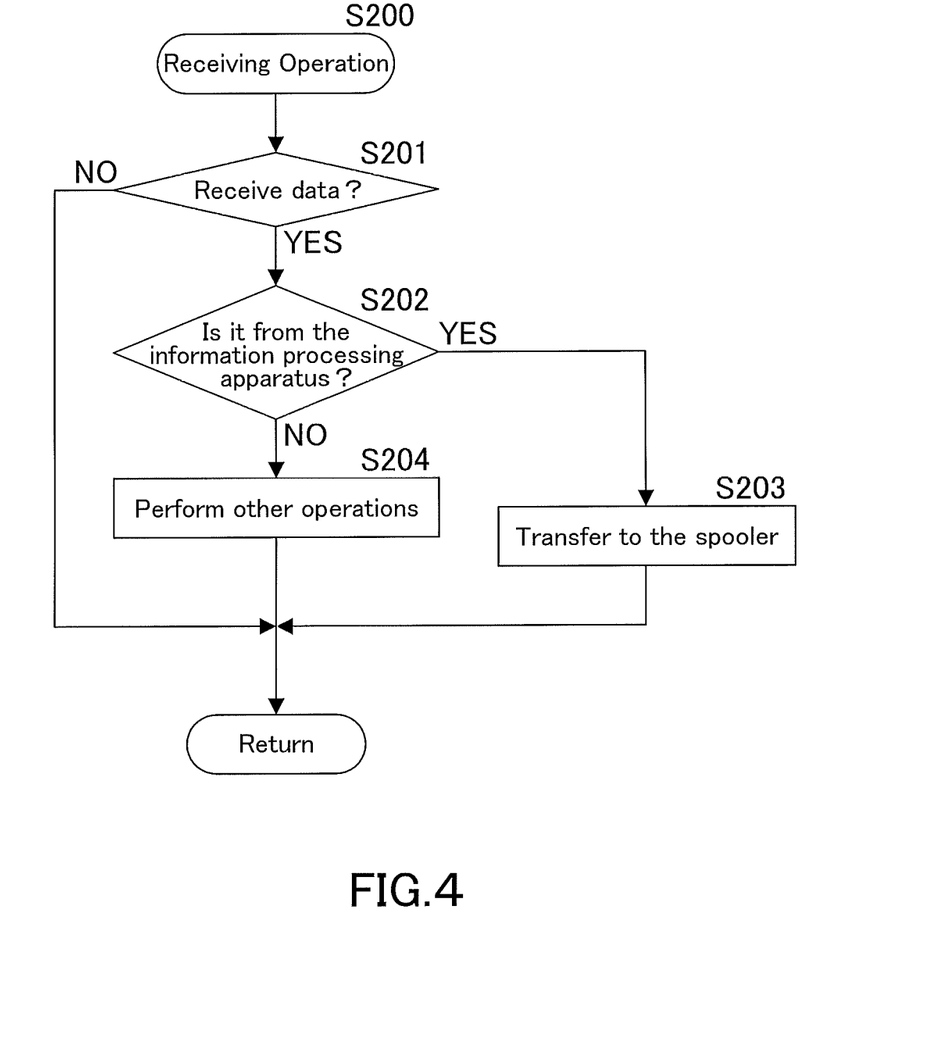
FIG. 4 is a flowchart representing the receiving operation of Step S200 in FIG. 3.

FIG. 4 is a flowchart representing the receiving operation of Step S200 in FIG. 3.

In Step S201, it is judged whether or not data is received from an external device. If data is received from an external device (YES in Step S201), it is further judged in Step S202 whether or not it is from the information processing apparatus 2, for example by examining the receiving port. If it is from the information processing apparatus 2 (YES in Step S202), it is transferred to the spooler 101a in Step S203. After that, the sub processing routine returns to the main processing routine.

If it is not from the information processing apparatus 2 (NO in Step S202), other receiving operations are performed in Step S204. After that, the sub processing routine returns to the main processing routine. If no data is received from an external device (NO in Step S201), the sub processing routine immediately returns to the main processing routine.

Figure 5:
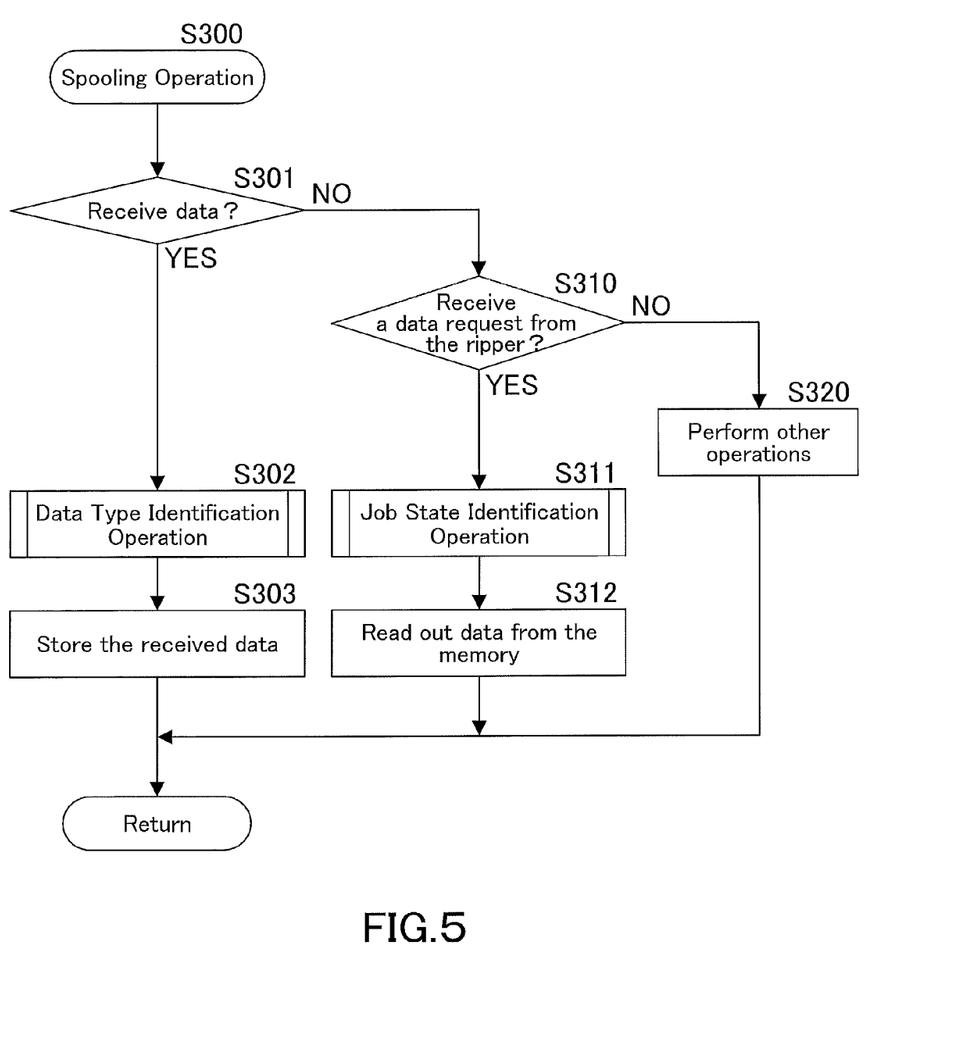
FIG. 5 is a flowchart representing the spooling operation of Step S300 in FIG. 3.

FIG. 5 is a flowchart representing the spooling operation of Step S300 in FIG. 3.

In Step S301, it is judged whether or not the transferred data is received by the spooler 101a. If it is received (YES in Step S301), a data type identification operation is performed in Step S302, and the received data is stored on the spooler memory 104a in Step S303. After that, the sub processing routine returns to the main processing routine. The data type identification operation will be later described in detail.

In Step S301, if the transferred data is not received (NO in Step S301), then it is judged in Step S310 whether or not a data request is received from the ripper 101b. If a data request is received from the ripper 101b (YES in Step S310), data to be transferred to the ripper 101b is selected based on the state of the job in Step S311, then read out from the spooler memory 104a and transferred to the ripper 101b in Step S312. After that, the sub processing routine returns to the main processing routine.

In Step S310, if a data request is not received from the ripper 101b (NO in Step S310), other operations are performed in Step S320. After that, the sub processing routine returns to the main processing routine.

Figure 6:
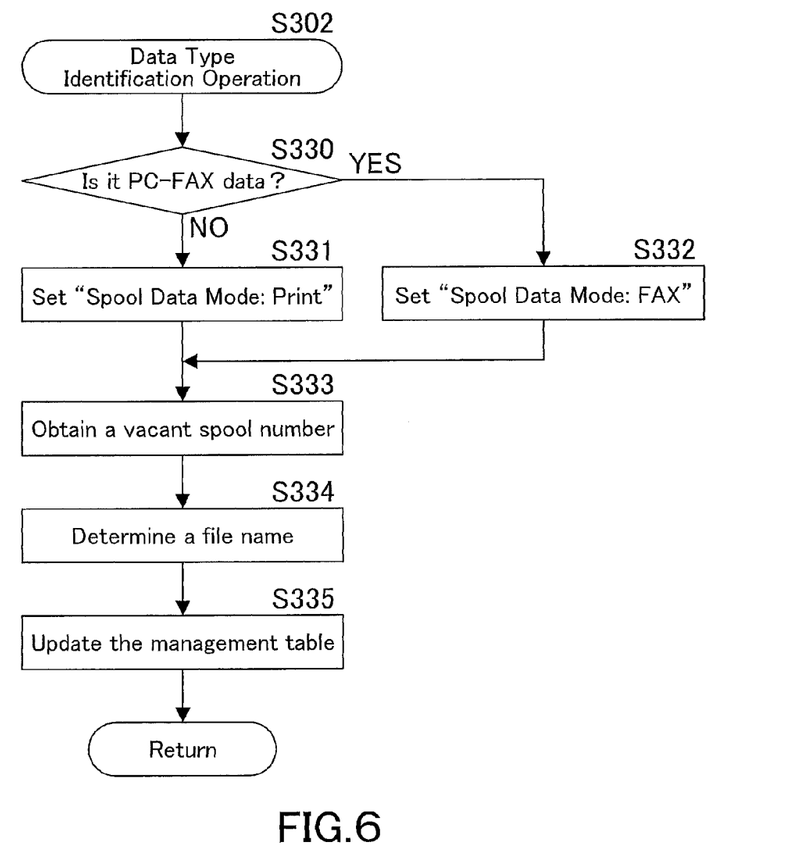
FIG. 6 is a flowchart representing the data type identification operation of Step S302 in FIG. 5.

FIG. 6 is a flowchart representing the data type identification operation of Step S302 in FIG. 5. This operation is to identify the type of the data received from an external device.

In Step S330, it is judged whether or not the received data is PC-FAX data. The judgment operation will be detailed as follows.

The received data carries its own information in a page description language (PJL language) in the header area. If the header information includes the following description "@PJL SET PCFAXMODE=ON", the received data is identified as PC-FAX data. If the header information does not include the description, the received data is identified as print data.

In Step S330, if the received data is not PC-FAX data (NO in Step S330), "Spool Data Mode" is set to "Print" in Step S331, and the sub processing routine then proceeds to Step S333. If the received data is PC-FAX data (YES in Step S330), "Spool Data Mode" is set to "FAX" in Step S332, and the sub processing routine then proceeds to Step S333.

Figure 7:
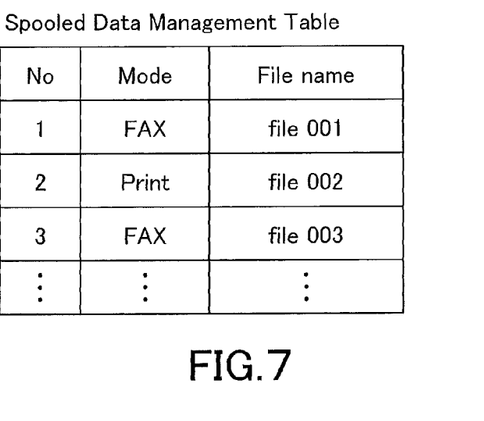
FIG. 7 is a spooled data management table.

In Step S333, a vacant spool number which is appropriate is obtained from a spooled data management table illustrated in FIG. 7. And a file name is determined for the received data in Step S334. Subsequently, in Step S335, the spooled data management table is updated, i.e. the mode set in Step S331 or S332 and the file name determined in Step S334 are connected to the number obtained in Step S333 and written in the spooled data management table. After that, the sub processing routine returns to the main processing routine.

Figure 8:
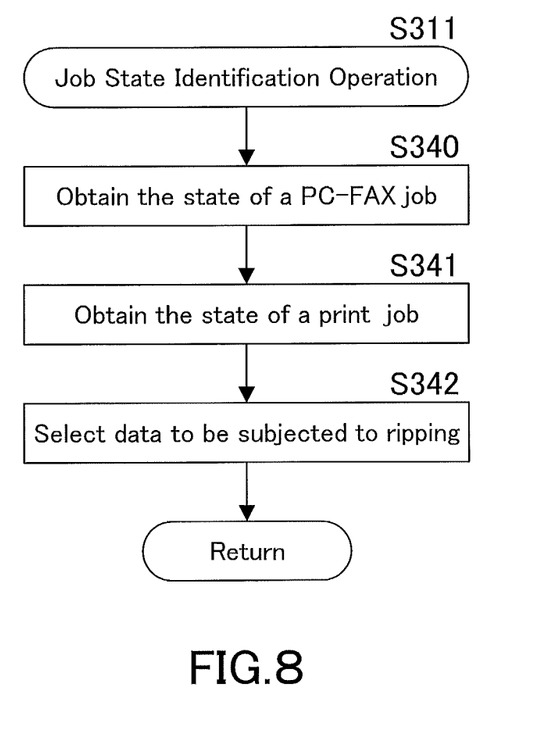
FIG. 8 is a flowchart representing the job state identification operation of Step S311 in FIG. 5.

FIG. 8 is a flowchart representing the job state identification operation of Step S311 in FIG. 5. This operation is to select data to transmit to the ripper 101b in response to a request from the ripper 101b.

In Step S340, the job controller 101c obtains information indicating whether or not the PC-FAX job is active and whether or not the PC-FAX job can be registered on the memory, by examining the state of the PC-FAX job.

Similarly, in Step S341, the job controller 101c obtains information indicating whether or not the print job is active and whether or not the print job can be registered on the memory, by examining the state of the print job.

And in Step S342, data to be subjected to ripping is selected based on the obtained information, but the selected data is different by the following criteria.

That is, if the FAX transmitter and receiver 110 is not in operation for FAX transmission while the printer 107 is also not in operation for printing, data waiting at the top of the spooled data management table is selected to be transferred to the ripper 101b.

If the FAX transmitter and receiver 110 is in operation for FAX transmission while the printer 107 is not in operation for printing, the print data is selected to be transferred to the ripper 101b.

If the FAX transmitter and receiver 101 is not in operation for FAX transmission while the printer 107 is in operation for printing, the PC-FAX data is selected to be transferred to the ripper 101b.

If the FAX transmitter and receiver 110 is in operation for FAX transmission while the printer 107 is also in operation for printing, data waiting at the top of the spooled data management table is selected to be transferred to the ripper 101b.

Alternatively, data to be subjected to ripping may be selected based on whether or not the number of the registered PC-FAX job reaches its upper limit and whether or not the number of the registered print jobs reaches its upper limit.

If the number of the PC-FAX jobs registered on the job register memory 104b reaches its upper limit while the number of the print jobs registered on the same does not, the print data is selected to be transferred to the ripper 101b.

If the number of the PC-FAX jobs registered on the job register memory 104b does not reach its upper limit while the number of the print jobs registered on the same reaches its upper limit, the PC-FAX data is selected to be transferred to the ripper 101b.

If the number of the PC-FAX jobs and the number of the print jobs both do not reach their upper limits, data waiting at the top of the spooled data management table is selected to be transferred to the ripper 101b.

As described above, a data file to be read out and subjected to ripping is selected among those spooled in the background, based on the states of PC-FAX and print jobs, i.e. the states of the FAX transmitter and receiver 110 and the printer 107. This could provide a solution to the unsolved problem that a long ripping time due to a large amount of PC-FAX data continuously received from the information processing apparatus 2 may lead to a long queuing time for print data further received after the PC-FAX data, and thus allow such print data to be printed without a long queuing time, prior to transmission of the large amount of PC-FAX data.

Similarly, this also could allow PC-FAX data further received after a large amount of print data, to be transmitted without a long queuing time, prior to printing of the large amount of print data.

Figure 9:
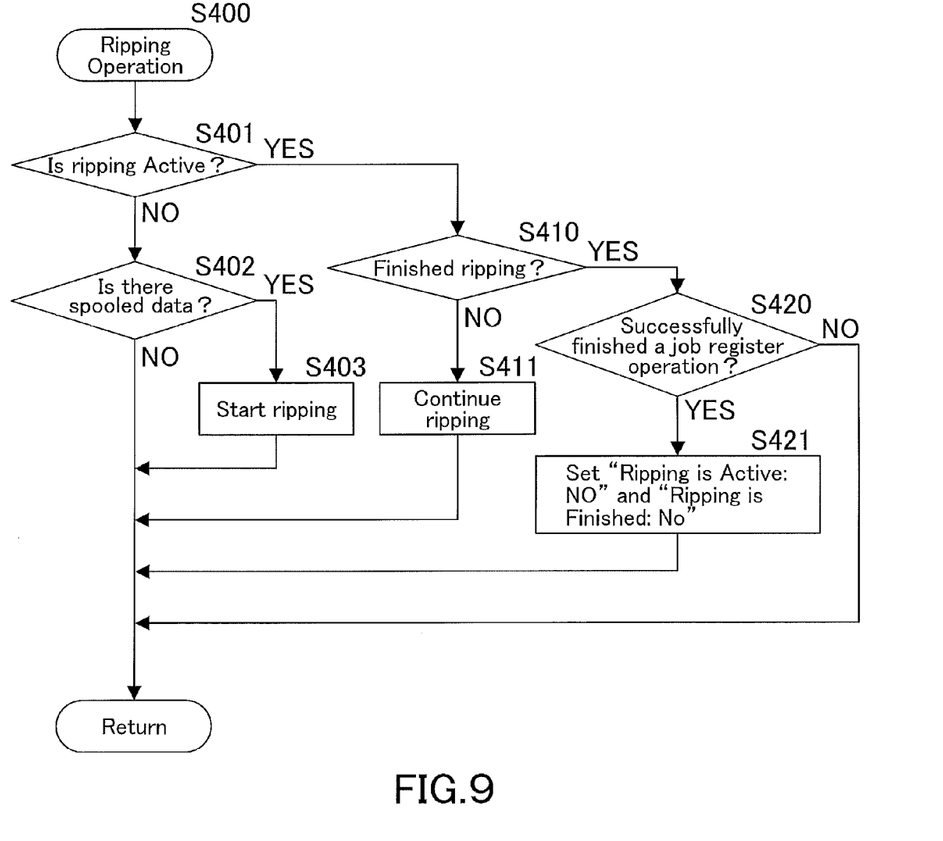
FIG. 9 is a flowchart representing the ripping operation of Step S400 in FIG. 3.

FIG. 9 is a flowchart representing the ripping operation of Step S400 in FIG. 3.

In Step S401, it is judged whether the operation state indicates "Ripping is Active: Yes" or "Ripping is Active: No".

If the operation state indicates "Ripping is Active: Yes" (YES in Step S401), it is further judged in Step S410 whether it further indicates "Ripping is Finished: Yes" or "Ripping is Finished: No". If it further indicates "Ripping is Finished: No", the ripping operation is allowed to continue in Step S411. And then, the sub processing routine returns to the main processing routine.

After the ripping operation is finished, the operation state is updated to "Ripping is Finished: Yes" (YES in Step S410), and the ripped data is registered on the job register memory 104b as a job. And in Step S420, it is judged whether or not the job register operation went successful.

If the job register operation went successful (YES in Step S420), the operation state is updated to "Ripping is Active: No" and "Ripping is Finished: No" in Step S421, and then the sub processing routine returns to the main processing routine. If the job register operation failed (NO in Step S420), the sub processing routine immediately returns to the main processing routine.

If the operation state does not indicate "Ripping is Active: Yes" (NO in Step S401), then it is judged in Step S402 whether or not there is data to be subjected to ripping in the spooled data management table (there is spooled data in the background). If there is spooled data in the background (YES in Step S402), a ripping operation is started while the operation state is updated to "Ripping is Active: Yes" in Step S403, and then the sub processing routine returns to the main processing routine. If there is no spooled data in the background (NO in Step S402), the sub processing routine immediately returns to the main processing routine.

Figure 10:
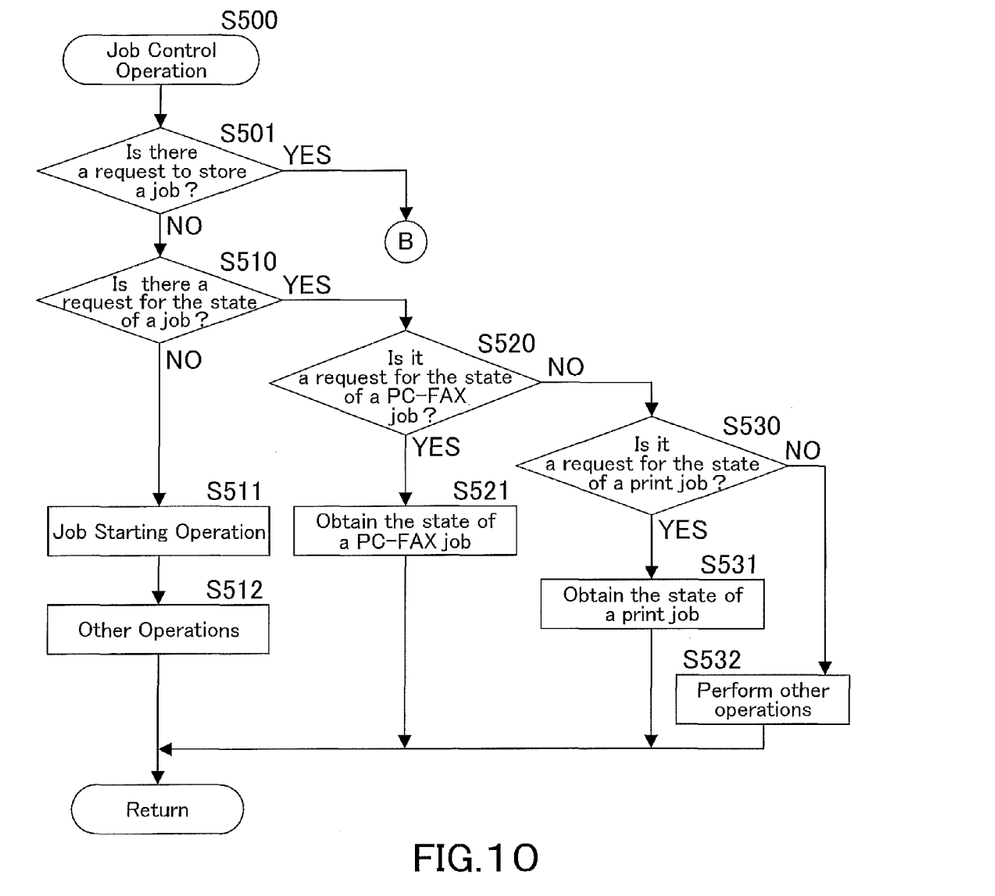
FIG. 10 is a flowchart representing the job control operation of Step S500 in FIG. 3.

FIG. 10 is a flowchart representing the job control operation of Step S500 in FIG. 3.

In Step S501, it is judged whether or not there is a request to register a job in the job register memory 104b.

If there is not such request (NO in Step S501), then it is judged in Step S510 whether or not there is a request for the state of a job. If there is a request for the state of a job (YES in Step S510), then it is judged in Step S520 whether or not it is a request for the state of a PC-FAX job. If it is a request for the state of a PC-FAX job (YES in Step S520), the state of a PC-FAX job is obtained in Step S521, and then the sub processing routine returns to the main processing routine.

If it is not a request for the state of a PC-FAX job (NO in Step S520), then it is judged in Step S530 whether or not it is a request for the state of a print job. If it is a request for the state of a print job (YES in Step S530), the state of a print job is obtained in Step S531, and then the sub processing routine returns to the main processing routine. If it is not a request for the state of a print job (NO in Step S530), another operation is performed in Step S532, and then the sub processing routine returns to the main processing routine.

Figure 11:
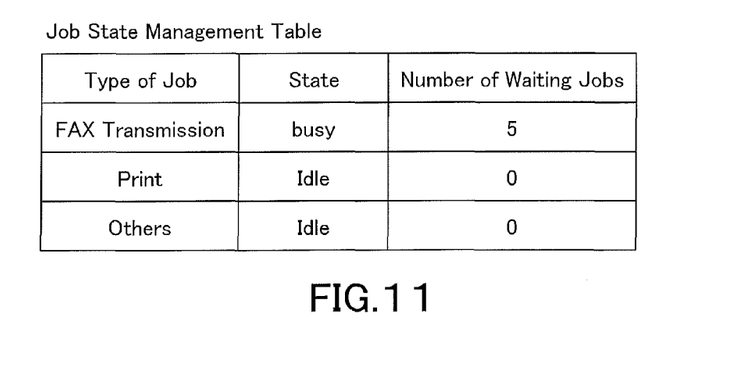
FIG. 11 is a job state management table.

The state of a job, which indicates whether or not the job is active (busy) and there are any available frames for jobs waiting in the queue, is obtained from a job state management table illustrated in FIG. 11.

In Step S510, if it is a request for the state of a job (NO in Step S510), a job starting operation is performed in Step S511. The job starting operation is performed based on the job state management table of FIG. 11. If none of a PC-FAX job, a print job, and another job is active while there are any jobs waiting in the queue, the job at the top of the queue is selected. And if it is a PC-FAX job, an instruction to start the PC-FAX job is given to the FAX transmitter and receiver 110; and if it is a print job, an instruction to start the print job is given to the printer 107. After giving an instruction to start a job, the state of the job is updated to "busy" and one is subtracted from the number of jobs waiting in the queue. The present invention does not relate to "another job" as described above and will not be further described in the specification.

Subsequently another operation is performed in Step S512, and then the sub processing routine returns to the main processing routine.

Figure 12:
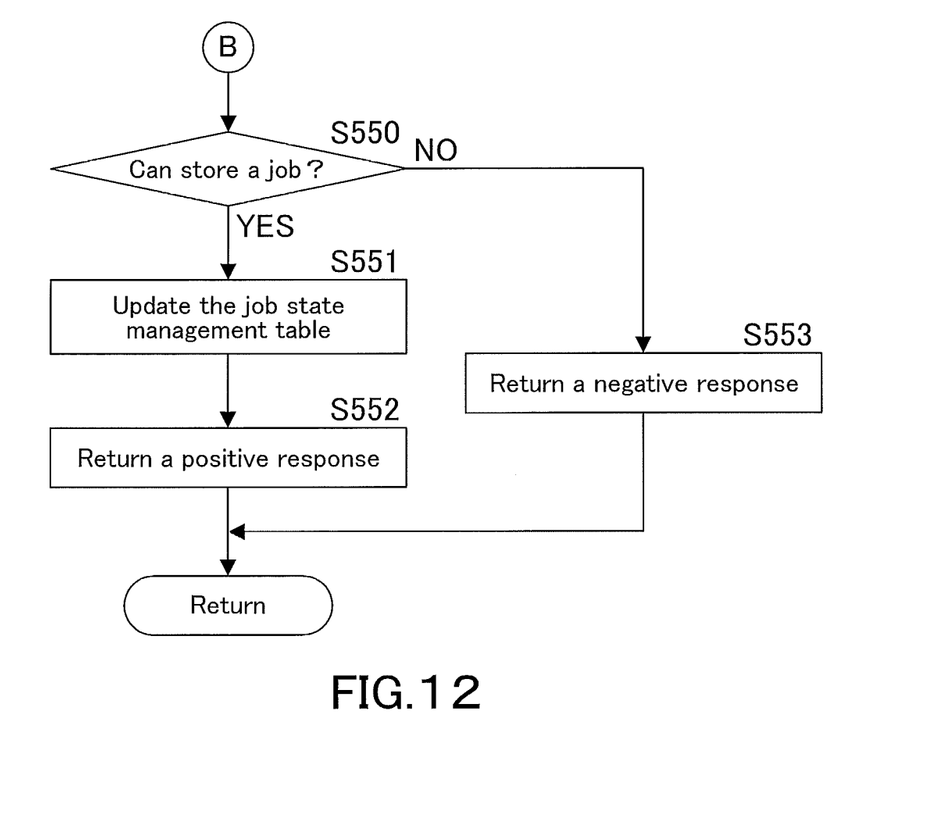
FIG. 12 is continued from the flowchart of FIG. 10.

In Step S501, if there is a request to store a job on the memory (YES in Step S501), the sub processing routine proceeds to another sub processing routine illustrated in FIG. 12

In Step S550 of FIG. 12, it is judged whether or not a job can be registered on the job register memory. This judgment is made based on the job state administration table of FIG. 10. That is, if it is a request to store a PC-FAX job on the memory, the table is searched for the number of the PC-FAX jobs waiting in the queue, and it is judged whether or not that number reaches its upper limit. If it is a request to store a print job on the memory, the table is searched for the number of the print jobs waiting in the queue, and it is judged whether or not that number reaches its upper limit. Too many jobs waiting in the queue would require a high capacity of the job register memory 104, making the whole configuration costly. This is why it is necessary to determine an appropriate upper limit on the number of jobs waiting in the queue. In this mode of implementation, the upper limit is determined to be "10", for example.

If the number of the jobs waiting in the queue is less than 10, it is then judged that a job can be stored on the memory (YES in Step S550), and accordingly the job state management table is updated in Step S551. A positive response is returned in Step S552, and then the sub processing routine returns to its superordinate processing routine. If it is judged that a job cannot be stored on the memory (NO in Step S550), a negative response is returned in Step S553, and then the sub processing routine returns to its superordinate processing routine.

After storing a PC-FAX or print job on the memory, the job queue management table is updated by adding one to the number of PC-FAX or print jobs waiting in the queue.

The present invention having been described above may be applied to the following modes.

[1] An image forming apparatus comprising:
  a receiver which receives facsimile or print data file written in a page description language, from an information processing apparatus;
  a spooler which stores the facsimile or print data file received by the receiver, on the spooler itself;
  a converter which converts the facsimile or print data file stored on the spooler, from a page description language to an image data format;
  a job generator which generates a job based on the image data file obtained by the converter;
  a facsimile transmitter which performs facsimile transmission;
  a printer which performs printing; and
  a job controller which instructs the facsimile transmitter or the printer to perform facsimile transmission or printing according to the job generated by the job generator, respectively;
wherein the converter selects the facsimile or print data file among those stored on the spooler, based on the state of the printer and the state of the facsimile transmitter, before converting the facsimile or print data file to an image data format.

[2] The image forming apparatus as recited in the aforementioned item [1], wherein if the facsimile transmitter and the printer are both not in operation, the converter converts the facsimile or print data file whichever is received first, to an image data format.

[3] The image forming apparatus as recited in the aforementioned item [1], wherein if the facsimile transmitter is in operation while the printer is not, the converter converts the print data file to an image data format prior to the facsimile data file.

[4] The image forming apparatus as recited in the aforementioned item [1], wherein if the facsimile transmitter is not in operation while the printer is in operation, the converter converts the facsimile data file to an image data format prior to the print data file.

[5] The image forming apparatus as recited in the aforementioned item [1], wherein if the facsimile transmitter and the printer are both in operation, the converter converts the facsimile or print data file whichever is received first, to an image data format.

[6] The image forming apparatus as recited in the aforementioned item [1], further comprising a registry being capable of registering facsimile data files, wherein if the number of those registered on the registry reaches its upper limit, the converter converts the print data file to an image data format prior to the facsimile data file.

[7] The image forming apparatus as recited in the aforementioned item [1], further comprising a registry being capable of registering print data files, wherein if the number of those registered on the registry reaches its upper limit, the converter converts the facsimile data file to an image data format prior to the print data file.

[8] An image processing method for an image forming apparatus, comprising:
  receiving facsimile or print data file written in a page description language, from an information processing apparatus;
  storing the facsimile or print data file received from the information processing apparatus, on a spooler;
  converting the facsimile or print data file stored on the spooler, from a page description language to an image data format;
  generating a job based on the image data file obtained by the ripping operation; and
  instructing a facsimile transmitter or a printer to perform facsimile transmission or printing according to the job generated based on the obtained image data file, respectively,
wherein the facsimile or print data file is selected among those stored on the spooler, based on the state of the printer and the state of the facsimile transmitter, before converting the facsimile or print data file to an image data format.

[9] An image processing program making a computer of an image forming apparatus execute:
  receiving facsimile or print data file written in a page description language, from an information processing apparatus;
  storing the facsimile or print data file received from the information processing apparatus, on a spooler;
  converting the facsimile or print data file stored on the spooler, from a page description language to an image data format;
  generating a job based on the image data file obtained by the ripping operation; and
  instructing a facsimile transmitter or a printer to perform facsimile transmission or printing according to the job generated based on the obtained image data file, respectively,
wherein before being converted to an image data format, the facsimile or print data file is selected among those stored on the spooler, based on the state of the printer and the state of the facsimile transmitter.

According to the invention as recited in the aforementioned item [1], before performing ripping, i.e. converting a data file in a page description language to an image data format, the image forming apparatus is configured to select a data file to be subjected to ripping, based on the state of the printer and the state of the facsimile transmitter. And thus, if the printer is not in operation, the image forming apparatus is allowed to perform ripping on a print data file prior to a facsimile data file received before the print data file. Also, if the transmitter is not in operation, the image forming apparatus is allowed to perform ripping on a facsimile data file prior to a print data file received before the facsimile data file. This means that the image forming apparatus is allowed to: print out a print data file without causing a long queuing time, prior to transmitting a large amount of facsimile data files received before the print data file from the information processing apparatus; and transmit a facsimile data file without causing a long queuing time, prior to printing out a large amount of print data files received before the facsimile data file from the information processing apparatus.

According to the invention as recited in the aforementioned item [2], if the facsimile transmitter and the printer are both not in operation, meaning that whichever is ready for operation, the image forming apparatus is allowed to perform ripping on a facsimile or print data file whichever is received first.

According to the invention as recited in the aforementioned item [3], if the facsimile transmitter is in operation while the printer is not, the image forming apparatus is allowed to perform ripping on a print data file prior to a facsimile data file. This means that the image forming apparatus is allowed to print out a print data file prior to transmitting a facsimile data file received before the print data file.

According to the invention as recited in the aforementioned item [4], if the facsimile transmitter is not in operation while the printer is in operation, the image forming apparatus is allowed to perform ripping on a facsimile data file prior to a print data file. This means that the image forming apparatus is allowed to transmit a facsimile data file prior to printing out a print data file received before the facsimile data file.

According to the invention as recited in the aforementioned item [5], if the facsimile transmitter and the printer are both in operation, the image forming apparatus is allowed to perform ripping on a facsimile or print data file whichever is received first.

According to the invention as recited in the aforementioned item [6], if the number of the facsimile data files stored on a registry reaches its upper limit, the image forming apparatus is allowed to perform ripping on a print data file prior to a facsimile data file. This means that the image forming apparatus is allowed to print out a print data file prior to transmitting a facsimile data file received before the print data file.

According to the invention as recited in the aforementioned item [7], if the number of the print data files stored on a registry reaches its upper limit, the image forming apparatus is allowed to perform ripping on a facsimile data file prior to a print data file. This means that the image forming apparatus is allowed to transmit a facsimile data file prior to printing out a print data file received before the facsimile data file.

According to the invention as recited in the aforementioned item [8], a print data file is allowed to be printed out without a long queuing time, prior to transmission of a large amount of facsimile data files received before the print data file from the information processing apparatus; and a facsimile data file is allowed to be transmitted without a long queuing time, prior to printing of a large amount of print data files received before the facsimile data file from the information processing apparatus.

According to the invention as recited in the aforementioned item [9], a computer of the image forming apparatus is allowed to: print out a print data file without a long queuing time, prior to transmitting a large amount of facsimile data files received before the print data file from the information processing apparatus; and transmit a facsimile data file without a long queuing time, prior to printing a large amount of print data files received before the facsimile data file from the information processing apparatus.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image forming apparatus comprising:
    a receiver which receives a facsimile data file or a print data file written in a page description language, from an information processing apparatus; a spooler which stores the facsimile data file or the print data file received by the receiver, on the spooler itself;
    a converter which converts the facsimile data file or the print data file stored on the spooler, from a page description language to an image data format;
    a job generator which generates a job based on the image data file obtained by the converter;
    a facsimile transmitter which performs facsimile transmission; a printer which performs printing; and
    a job controller which instructs the facsimile transmitter or the printer to perform facsimile transmission or printing according to the job generated by the job generator, respectively,
    wherein when there is both facsimile and print data stored on the spooler, the converter selects the facsimile data file or the print data file from the spooler, based on a combination of the state of the printer and the state of the facsimile transmitter, before conversion of the selected data file to an image data format, such that when the printer or the facsimile transmitter is presently inactive, then the inactive printer or the inactive facsimile transmitter will be activated after the conversion of the selected data file to perform a job based on the converted data file.

2. The image forming apparatus as recited in claim 1, wherein if the facsimile transmitter and the printer are both not in operation, the converter converts the facsimile data file or the print data file whichever is received first, to an image data format.

3. The image forming apparatus as recited in claim 1, wherein if the facsimile transmitter is in operation while the printer is not, the converter converts the print data file to an image data format prior to the facsimile data file.

4. The image forming apparatus as recited in claim 1, wherein if the facsimile transmitter is not in operation while the printer is in operation, the converter converts the facsimile data file to an image data format prior to the print data file.

5. The image forming apparatus as recited in claim 1, wherein if the facsimile transmitter and the printer are both in operation, the converter converts the facsimile data file or the print data file whichever is received first, to an image data format.

6. The image forming apparatus as recited in claim 1, further comprising a registry being capable of registering facsimile data files, wherein if the number of those registered on the registry reaches its upper limit, the converter converts the print data file to an image data format prior to the facsimile data file.

7. The image forming apparatus as recited in claim 1, further comprising a registry being capable of registering print data files, wherein if the number of those registered on the registry reaches its upper limit, the converter converts the facsimile data file to an image data format prior to the print data file.

8. An image processing method for an image forming apparatus, comprising:
    receiving a facsimile data file or a print data file written in a page description language, from an information processing apparatus;
    storing the facsimile data file or the print data file received from the information processing apparatus, on a spooler;
    converting the facsimile data file or the print data file stored on the spooler, from a page description language to an image data format;
    generating a job based on the image data file obtained by the ripping operation; and instructing a facsimile transmitter or a printer to perform facsimile transmission or printing according to the job generated based on the obtained image data file, respectively,
    wherein when there is both facsimile and print data stored on the spooler, selecting the facsimile data file or the print data file from the spooler, based on a combination of the state of the printer and the state of the facsimile transmitter, before converting the selected data file to an image data format, such that when the printer or the facsimile transmitter is presently inactive, then the inactive printer or the inactive facsimile transmitter will be activated after the conversion of the selected data file to perform a job based on the converted data file.

9. The image processing method as recited in claim 8, wherein if the facsimile transmitter is in operation while the printer is not, the print data file is converted to an image data format prior to the facsimile data file.

10. The image processing method as recited in claim 8, wherein if the facsimile transmitter is not in operation while the printer is in operation, the facsimile data file is converted to an image data format prior to the print data file.

11. The image processing method as recited in claim 8, wherein if the facsimile transmitter and the printer are both in operation, the facsimile data file or the print data file whichever is received first is converted to an image data format prior to the other.

12. The image processing method as recited in claim 8, wherein:
the image forming apparatus further comprises a registry being capable of registering facsimile data files; and
if the number of those registered on the registry reaches its upper limit, the print data file is converted to an image data format prior to the facsimile data file.

13. The image processing method as recited in claim 8, wherein:
the image forming apparatus further comprises a registry being capable of registering print data files; and
if the number of those registered on the registry reaches its upper limit, the facsimile data file is converted to an image data format prior to the print data file.

14. A non-transitory computer-readable recording medium with an image processing program being stored thereon to make a computer of an image forming apparatus execute:
receiving a facsimile data file or a print data file written in a page description language, from an information processing apparatus;
storing the facsimile data file or the print data file received from the information processing apparatus, on a spooler;
converting the facsimile data file or the print data file stored on the spooler, from a page description language to an image data format;
generating a job based on the image data file obtained by the ripping operation; and instructing a facsimile transmitter or a printer to perform facsimile transmission or printing according to the job generated based on the obtained image data file, respectively,
wherein when there is both facsimile and print data stored on the spooler, selecting the facsimile data file or the print data file from the spooler, based on a combination of the state of the printer and the state of the facsimile transmitter, before converting the selected data file to an image data format, such that when the printer or the facsimile transmitter is presently inactive, then the inactive printer or the inactive facsimile transmitter will be activated after conversion of the selected data file to perform a job based on the converted data file.

15. The non-transitory computer-readable recording medium as recited in claim 14, wherein if the facsimile transmitter and the printer are both not in operation, the facsimile data file or the print data file whichever is received first is converted to an image data format prior to the other.

16. The non-transitory computer-readable recording medium as recited in claim 14, wherein if the facsimile transmitter is in operation while the printer is not, the print data file is converted to an image data format prior to the facsimile data file.

17. The non-transitory computer-readable recording medium as recited in claim 14, wherein if the facsimile transmitter is not in operation while the printer is in operation, the facsimile data file is converted to an image data format prior to the print data file.

18. The non-transitory computer-readable recording medium as recited in claim 14, wherein if the facsimile transmitter and the printer are both in operation, the facsimile data file or the print data file whichever is received first is converted to an image data format prior to the other.

19. The non-transitory computer-readable recording medium as recited in claim 14, wherein:
the image forming apparatus further comprises a registry being capable of registering facsimile data files; and
if the number of those registered on the registry reaches its upper limit, the print data file is converted to an image data format prior to the facsimile data file.

20. The non-transitory computer-readable recording medium as recited in claim 14, wherein:
the image forming apparatus further comprises a registry being capable of registering print data files; and
if the number of those registered on the registry reaches its upper limit, the facsimile data file is converted to an image data format prior to the print data file.

21. An image forming apparatus comprising:
a receiver which receives a facsimile data file or a print data file written in a page description language, from an information processing apparatus;
a spooler which stores the facsimile data file or the print data file received by the receiver, on the spooler itself;
a converter which converts the facsimile data file or the print data file stored on the spooler, from a page description language to an image data format;
a job generator which generates a job based on the image data file obtained by the converter;
a facsimile transmitter which performs facsimile transmission;
a printer which performs printing; and
a job controller which instructs the facsimile transmitter or the printer to perform facsimile transmission or printing according to the job generated by the job generator, respectively,
when there is both facsimile and print data stored on the spooler, the converter selects the facsimile data file or the print data file from the spooler, based on a combination of the state of the printer and the state of the facsimile transmitter, such that when the printer is inactive and the facsimile transmitter is active, the converter selects the print data file for conversion to an image data format and then activates the printer after the conversion of the print data file, and when the printer is active and the facsimile transmitter is inactive, the converter selects the facsimile data file for conversion to an image data format and then activates the facsimile transmitter after the conversion of the facsimile data file.

* * * * *